April 6, 1926.  W. R. WILSON  1,579,990
OPTOMETER
Filed April 7, 1923   9 Sheets-Sheet 1
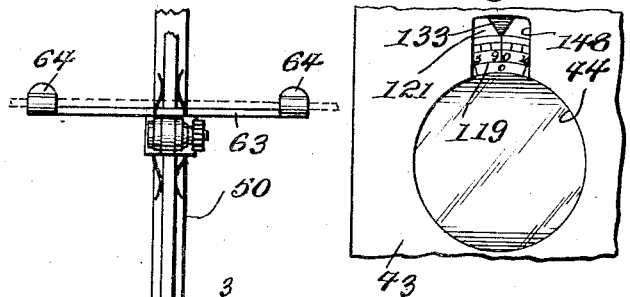
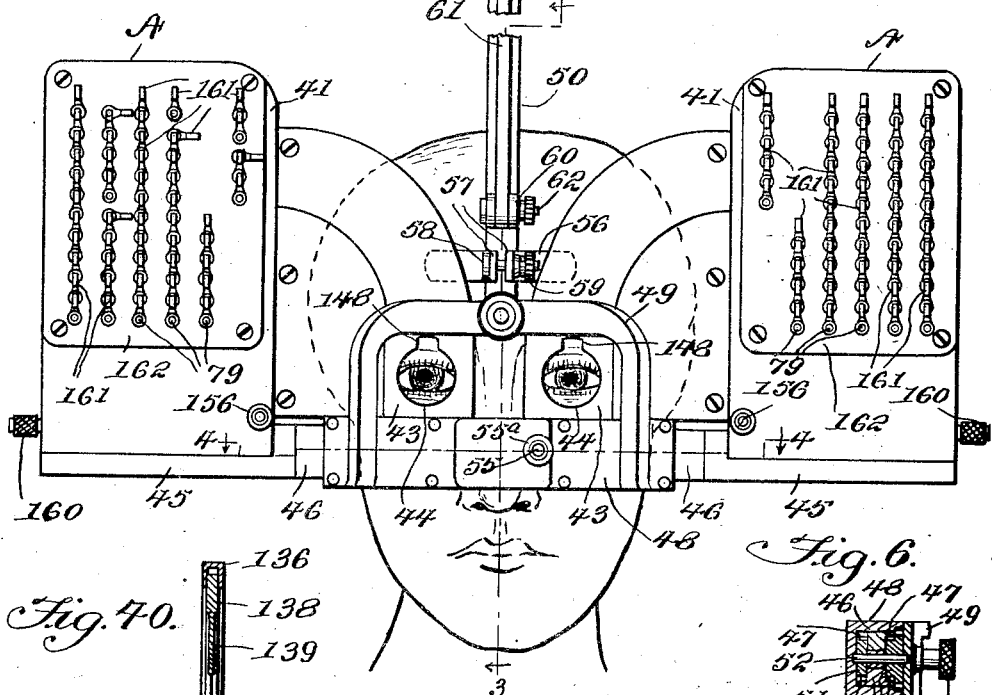
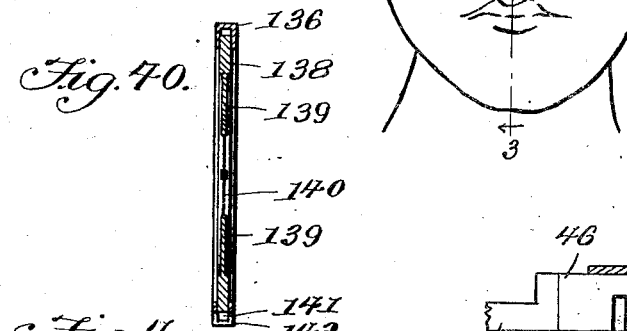
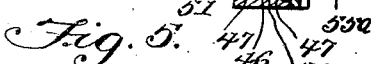
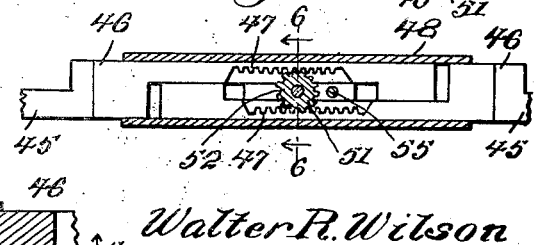
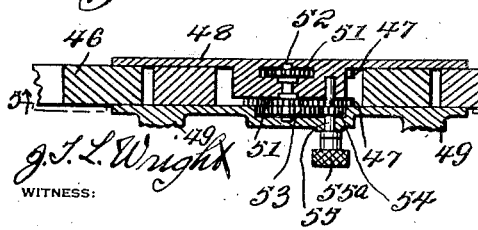
Walter R. Wilson
INVENTOR
BY Victor J. Evans
ATTORNEY April 6, 1926.
W. R. WILSON
OPTOMETER
Filed April 7, 1923
1,579,990
9 Sheets-Sheet 2
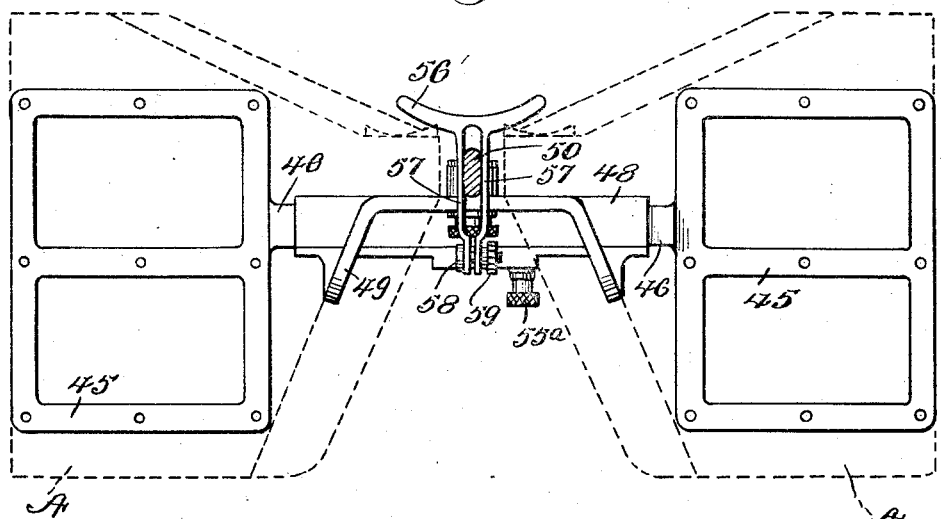
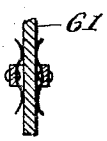
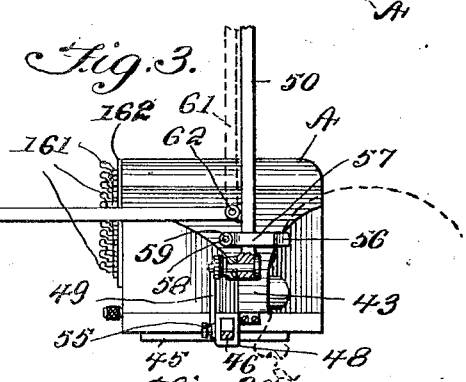
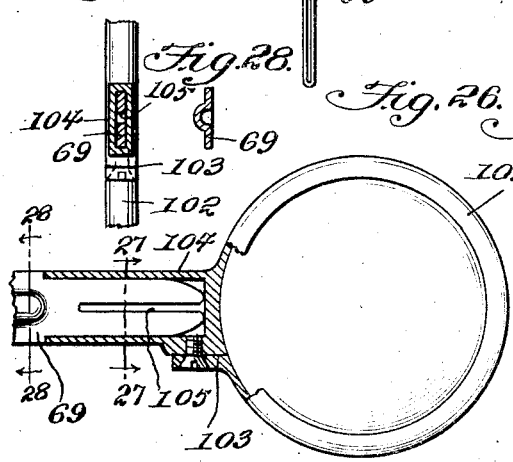
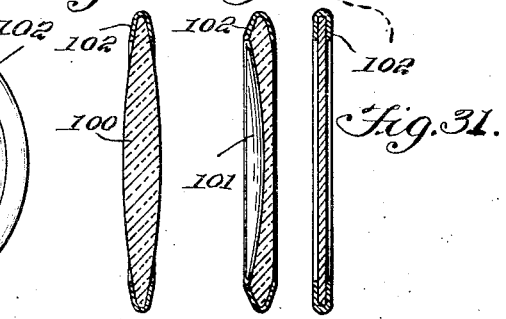
Walter R. Wilson
INVENTOR
J. T. L. Wright
WITNESS:
BY Victor J. Evans
ATTORNEY

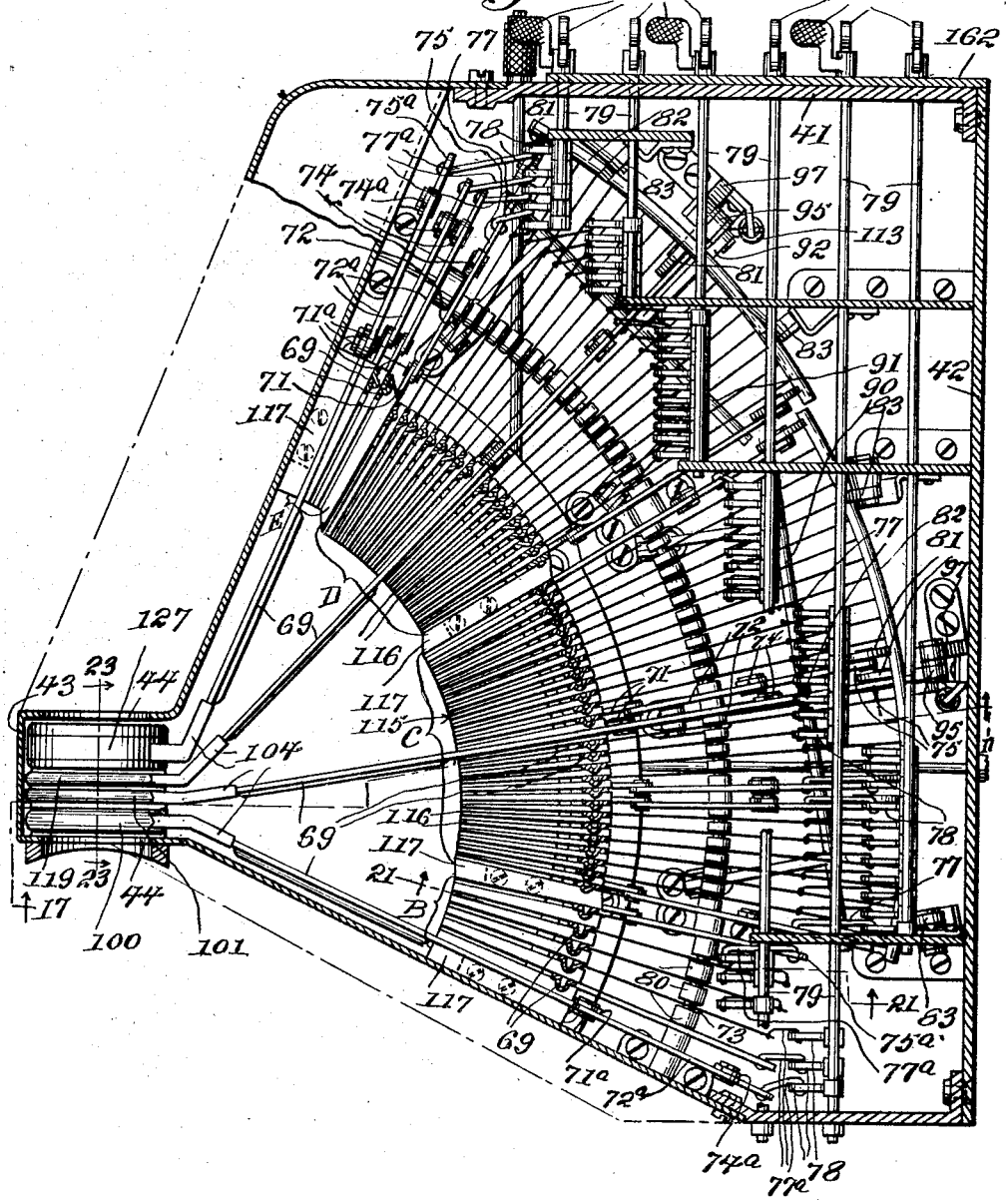

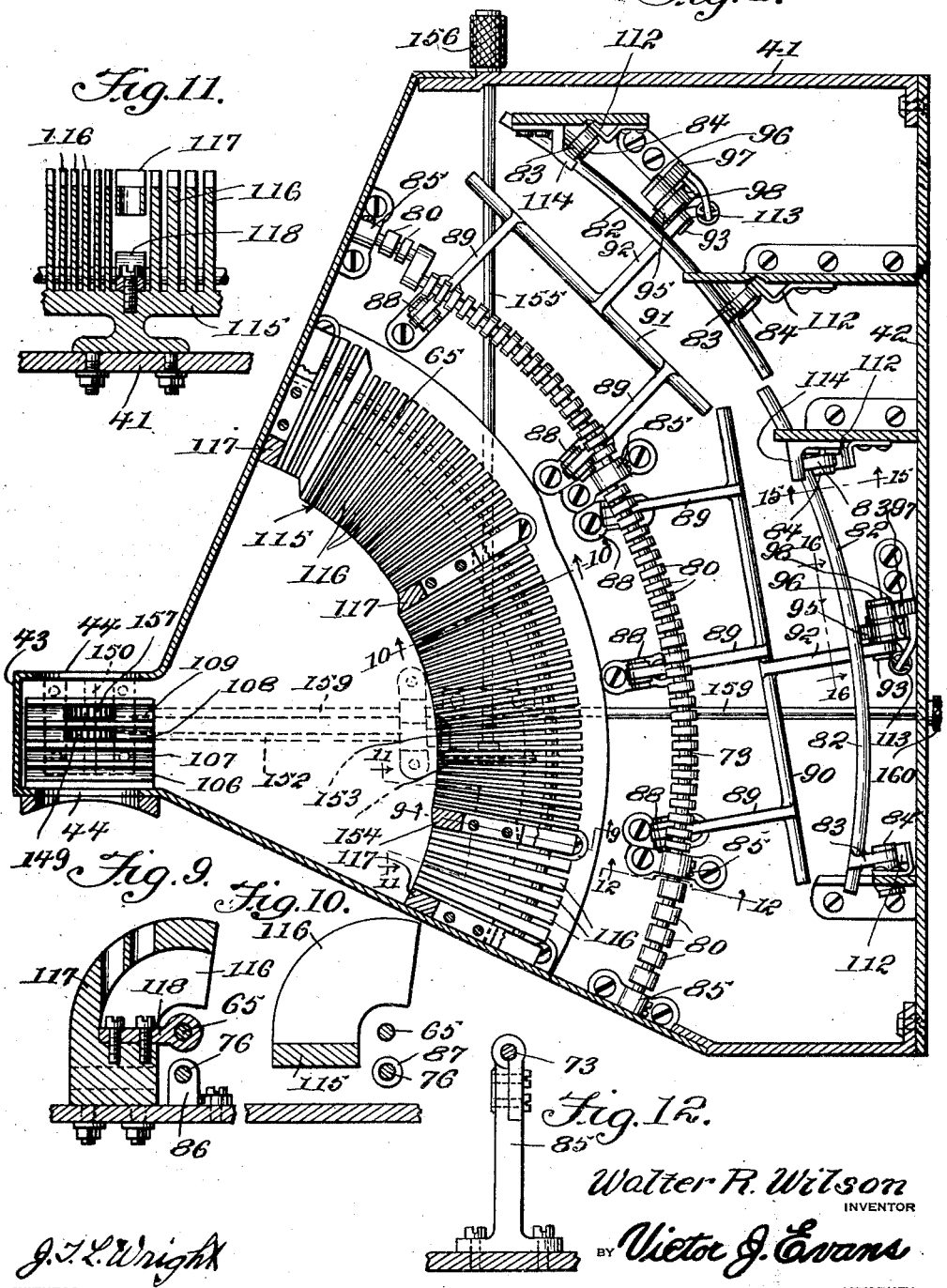

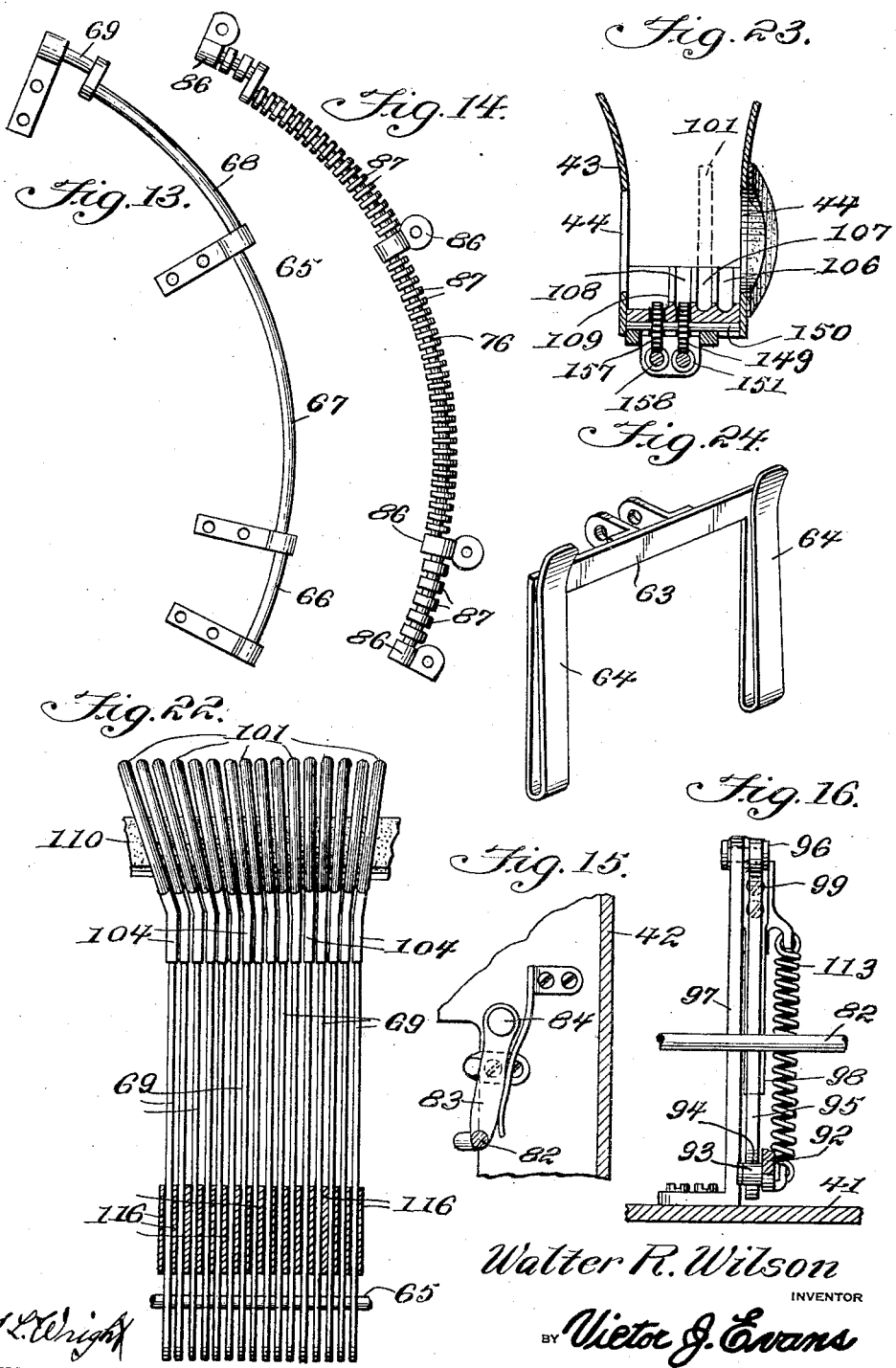

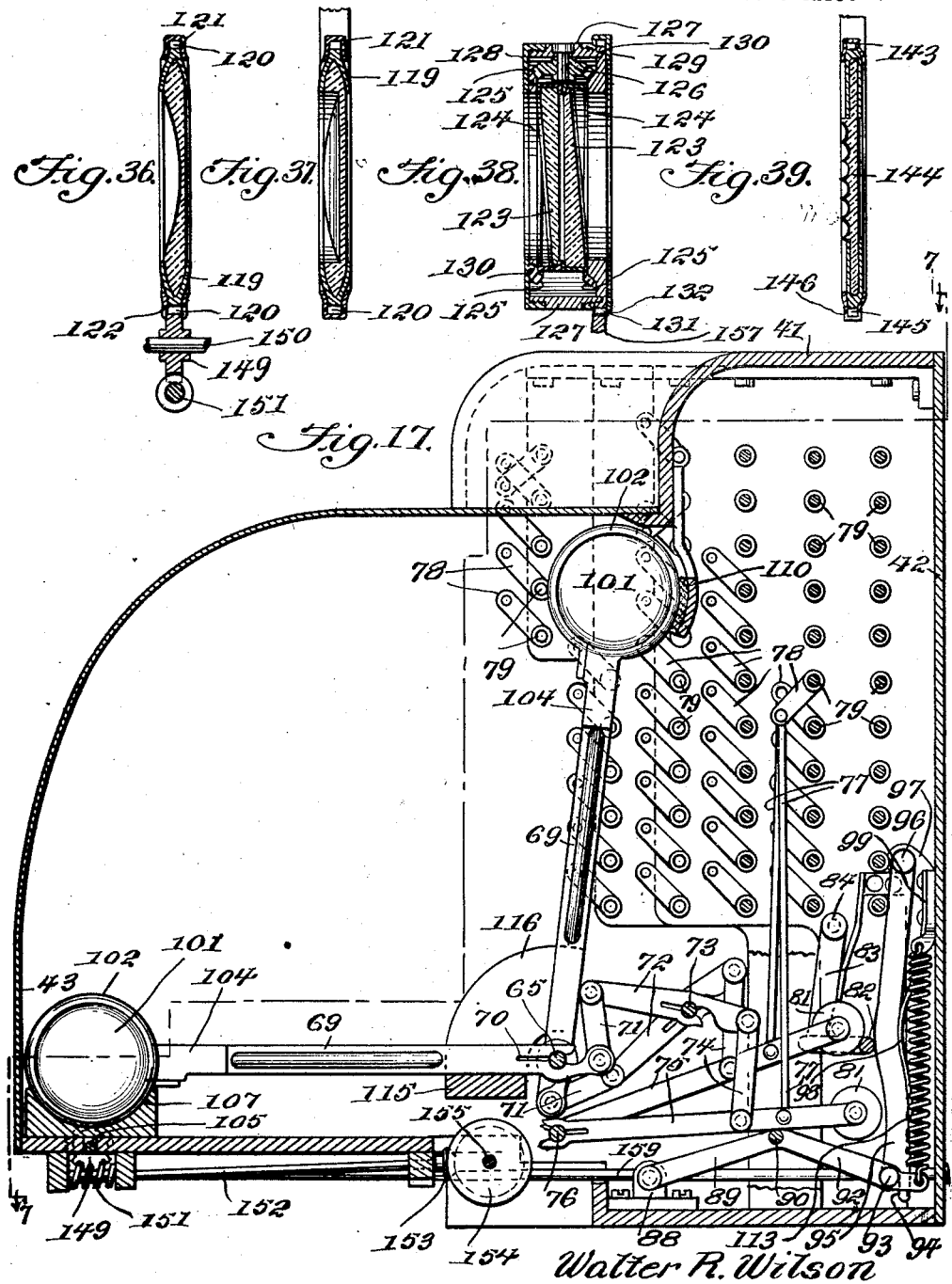

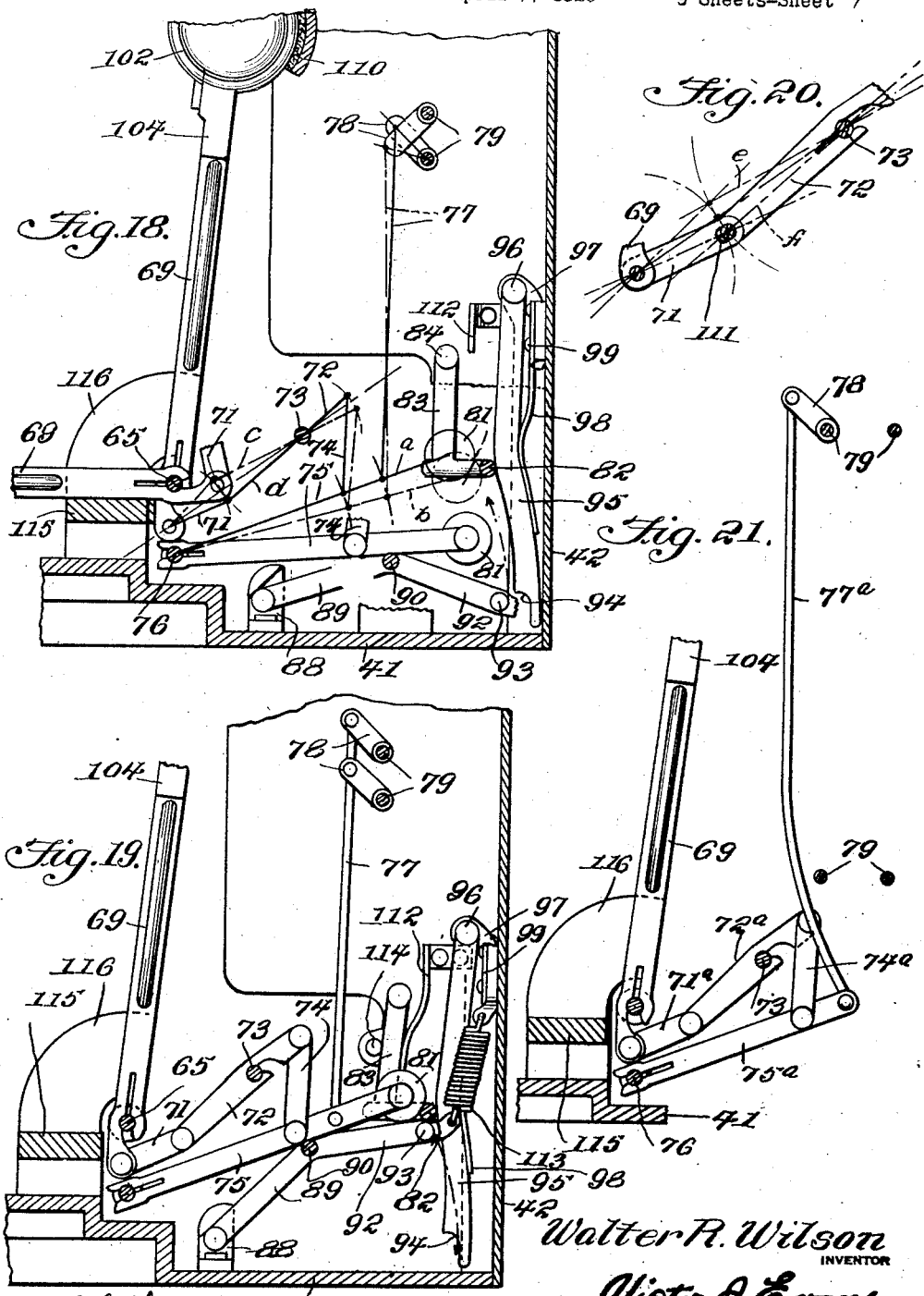

April 6, 1926.
W. R. WILSON
OPTOMETER
Filed April 7, 1923　　9 Sheets-Sheet 8
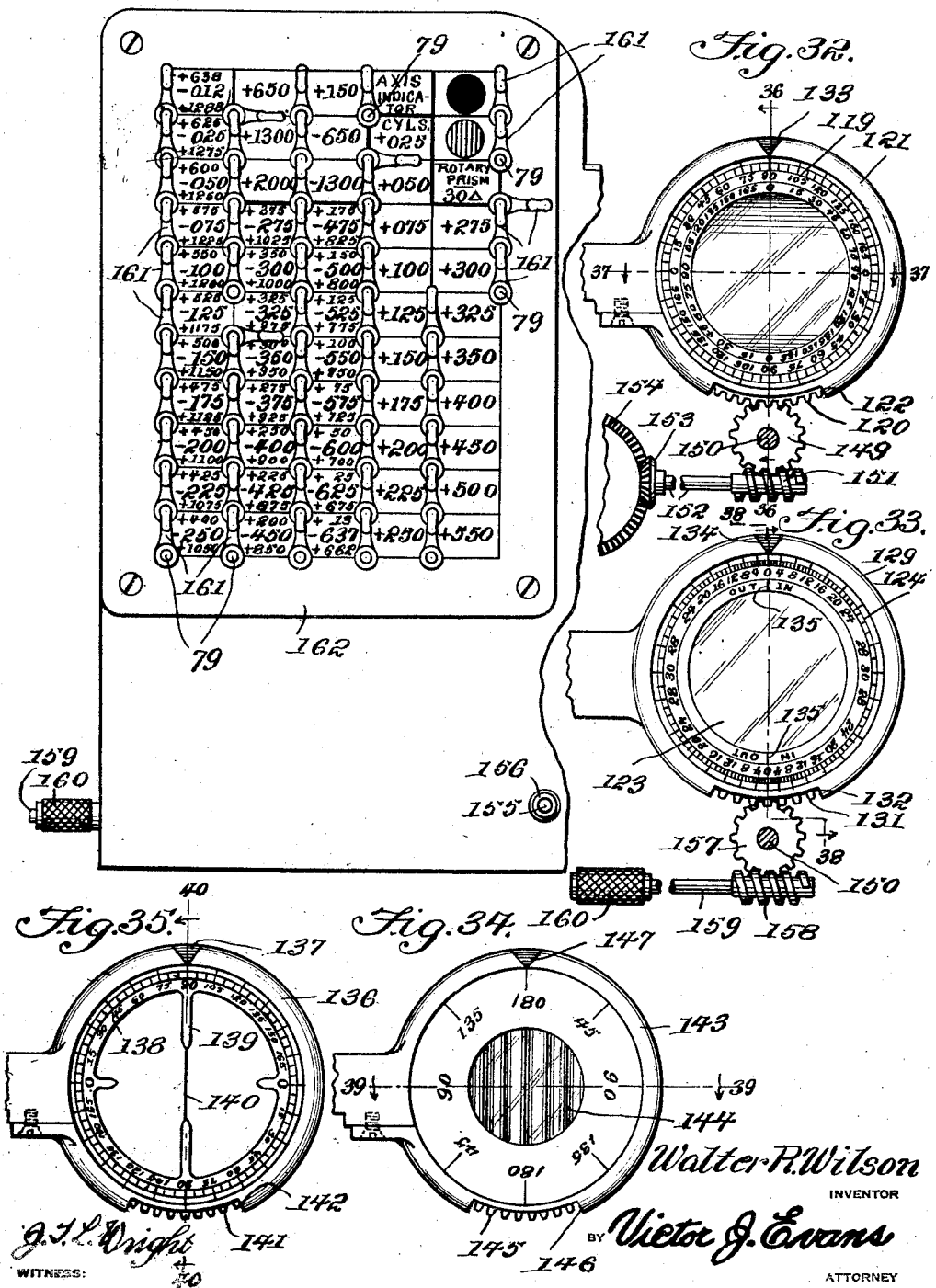

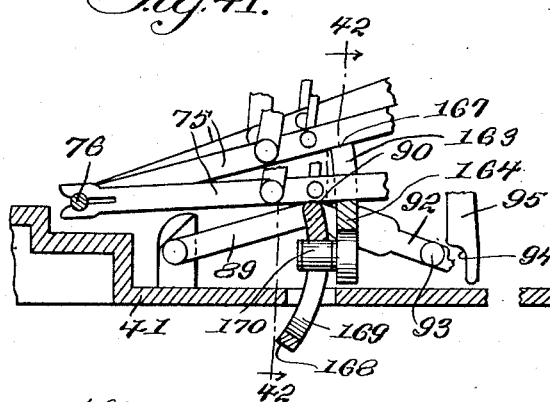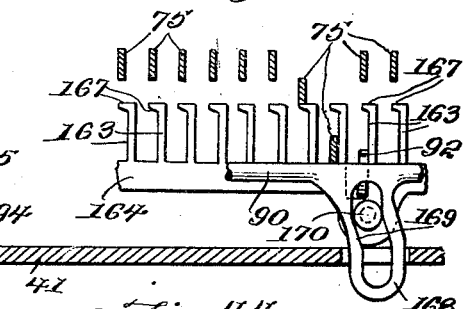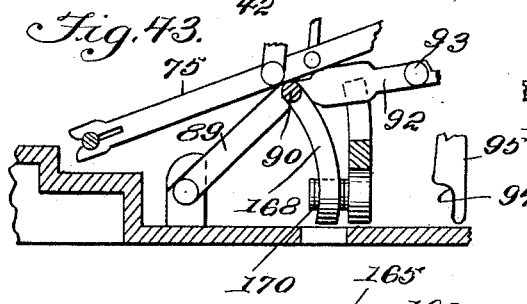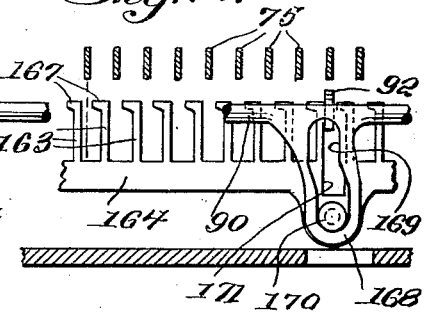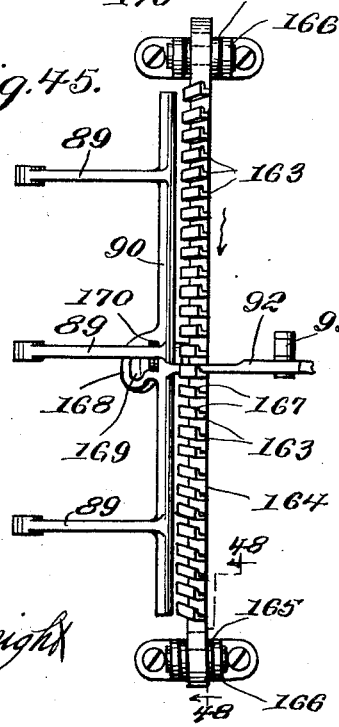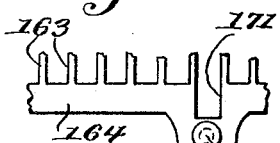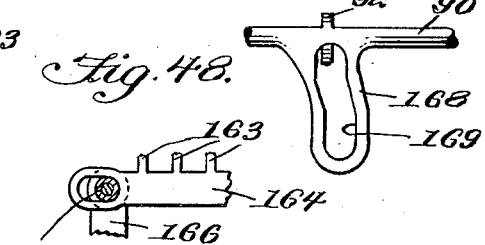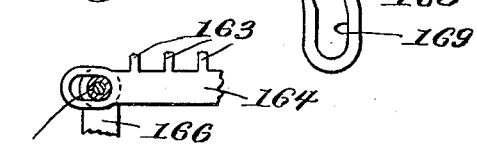

Patented Apr. 6, 1926.

1,579,990

UNITED STATES PATENT OFFICE.

WALTER R. WILSON, OF DOUGLAS, GEORGIA.

OPTOMETER.

Application filed April 7, 1923. Serial No. 630,623.

*To all whom it may concern:*

Be it known that I, WALTER R. WILSON, a citizen of the United States, residing at Douglas, in the county of Coffee and State of Georgia, have invented new and useful Improvements in Optometers, of which the following is a specification.

This invention relates to improvements in optometers and has for an object the provision of an instrument for determining errors of refraction in the correction of various defects of vision.

Another object of the invention is the provision of means whereby different lenses may be moved singly into the line of vision of a patient in the shortest possible time and with a minimum number of operations, so that the lapse of time between changes of power is not sufficient to permit of change of accommodation of the ocular muscles.

Another object is the provision of novel means for selecting the proper lens or lenses to be used and for computing the result, a table or chart being provided whose readings are determined by the particular lens or lenses selected, with the result of those most commonly used already computed.

Another object of the invention is the provision of means whereby various elements such as an axis indicator, rotary prism and rotary cylinders may be moved into the line of vision of the patient and manually rotated to obtain the desired power, the result of which is plainly readable in upright position and always at the same point, thus saving time and reducing liability of error.

Another object of the invention is the provision of an instrument wherein the entire examination may be made without removing the said instrument from the face of the patient and by which the resultant findings can be almost instantly set up before the patient's eyes, with the correction required.

Another object of the invention is the provision of means whereby the interpupilary distance of the lens centers may be adjusted, so that great accuracy of correction may be obtained.

Another object of the invention is the provision of means whereby the entire instrument may be adjusted to suit each individual patient, the adjustment being such that the patient's nose and mouth will be so positioned as not to breathe into or upon the instrument and thus render the same unsanitary or dangerous to others.

With the above and other objects in view, the invention further includes the following novel features and details of construction, to be hereinafter more fully described, illustrated in the accompanying drawings and pointed out in the appended claims.

In the drawings:—

Figure 1 is an elevation of an optometer constructed in accordance with the invention, the head of the patient being shown in position for examination of the eyes.

Figure 2 is a plan view of the cabinet supports and connecting members, the cabinets being shown by dotted lines and the hanger rod shown in section.

Figure 3 is a section taken substantially on the line 3—3 of Figure 1 and showing the means for supporting the reading card.

Figure 4 is a detail sectional view taken substantially on the line 4—4 of Figure 1.

Figure 5 is a view on the line 5—5 of Figure 4.

Figure 6 is a section on the line 6—6 of Figure 5.

Figure 7 is a sectional view taken substantially on the line 7—7 of Figure 17.

Figure 8 is a view similar to Figure 7 with parts removed.

Figure 9 is a section on the line 9—9 of Figure 8.

Figures 10, 11 and 12 are sections taken respectively on the lines 10—10, 11—11, and 12—12 of Figure 8.

Figure 13 is a top plan view of the pivot shaft for the lens arms.

Figure 14 is a similar view of the pivot shaft for the operating arms with the spacing elements therein.

Figures 15 and 16 are sections taken substantially on the lines 15—15 and 16—16 of Figure 8.

Figure 17 is a vertical sectional view through one of the cabinets showing a rotary cylinder arranged before the sight opening.

Figures 18 and 19 are fragmentary views showing different positions of the parts during the operation of the device.

Figure 20 is a detail view illustrating the off-center position of one of the levers and links of the lens arms.

Figure 21 is a fragmentary view illustrating the means for moving the master lenses, rotary prism, blinder and one of the cylinders.

Figure 22 is a fragmentary elevation of the minus lens group.

Figure 23 is a section taken substantially on the line 23—23 of Figure 7.

Figure 24 is a detail perspective view of the card holder.

Figure 25 is an enlarged view of the rear of one of the cabinets showing the index plate and operating arms.

Figure 26 is a detail view of the form of connection between the non-rotatable lenses, the blinder and their supporting arms.

Figures 27 and 28 are sectional views taken respectively on the lines 27—27 and 28—28 of Figure 26.

Figures 29, 30 and 31 are sections taken diametrically through one of the plus lenses, one of the minus lenses and the blinder, in the order named.

Figure 32 is a detail elevation of one of the rotary cylinders and the operating means therefor.

Figure 33 is a similar view of one of the rotary prisms.

Figure 34 is a like view of one of the cylinders for muscle testing.

Figure 35 is an elevation of one of the axis indicators.

Figure 36 is a section on the line 36—36 of Figure 32.

Figure 37 is a section at right angles to Figure 36.

Figure 38 is a section taken substantially on the line 38—38 of Figure 33.

Figure 39 is a section taken substantially on the line 39—39 of Figure 34.

Figure 40 is a section on the line 40—40 of Figure 35.

Figure 41 is a fragmentary view illustrating means for preventing downward movement of certain of the testing elements.

Figure 42 is a section on the line 42—42 of Figure 41.

Figure 43 is a view similar to Figure 41 showing the parts in different position.

Figure 44 is a view similar to Figure 42 with the parts in the position shown in Figure 43.

Figure 45 is a detail plan view of the locking mechanism.

Figure 46 is a fragmentary view of the stop bar.

Figure 47 is a fragmentary view of the cam arm.

Figure 48 is a detail section on the line 48—48 of Figure 45.

Figure 49 is a fragmentary sectional view on the line 49—49 of Figure 3.

Figure 50 is a view showing one of the openings with the rotary cylinder in position to function as a blinder.

Referring to the drawings in detail, wherein like characters of reference denote corresponding parts, the invention is shown as comprising a pair of cabinets indicated generally at A. In plan view, each cabinet is of the shape shown in Figures 7 and 8 and comprises a casing 41 having a removable side 42, by means of which access may be had to the interior. Opposite the removable side, the cabinet is provided with a restricted compartment 43, whose opposite walls are relatively close together. These walls are provided with opposite sight openings 44 through which a patient is adapted to look during the eye examination. The bottoms of the cabinets have secured thereto supporting frames 45, see Fig. 5, having arms 46 extending therefrom, the said arms having their inner extremities overlapping and provided with opposed teeth to provide rack bars 47. The arms 46 operate in a guide channel 48 which has secured thereto the opposite ends of a lug 49, while extending from this lug is a rod 50 which may be secured to a suitable support to provide a hanger rod for supporting the instrument.

The racks 47 are duplicated, that is, an upper and lower rack is provided for each arm 46, while gears 51 operatively connect the opposite racks of each arm, the said gears being mounted upon a shaft 52 having bearings in the guide channel 48, this shaft however extending beyond the guide channel and being provided with an operating knob 55. A reducing gear is thus provided between the knob 55 and the arms 46 and the latter may be moved slowly and relatively to adjust the interpupilary distance of the sight openings 44 for the accommodation of each individual patient.

Mounted upon the hanger rod 50 is a brow piece 56, the latter being provided with spaced resilient arms 57 which engage upon opposite sides of the rod 50 and which are adjustably connected by means of a bolt 58 having an adjusting nut 59 thereon. The brow piece may thus be adjusted vertically, horizontally, or may be inclined to provide a comfortable head rest for the patient.

Pivotally secured to the rod 50 as shown at 60, see Fig. 3, is one end of an arm 61, the position of which is regulated by an adjusting nut 62. The outer end of the arm 61 has pivotally mounted thereon a card holder 63, which is illustrated in detail in Figure 24 of the drawings. This holder includes spring fingers 64 for frictionally holding a reading card and the latter may be accurately positioned in line with the sight openings 44 so as to be in the line of vision of the patient.

The cabinets A are of like construction and contain mechanisms and elements of like character, so that only one of the cabinets will be described in detail. Located within the cabinet and adapted to be moved into and out of position within the sight openings 44 is a plurality of eye testing elements which consist of lenses, cylinders, prisms and other elements of like character commonly used in testing eyes for the correction of various defects. For this purpose there is provided what may be termed a main pivot shaft 65 upon which the testing elements are grouped, group B representing what may be termed plus and minus master lenses or high power lenses, six of which are provided. Group C represents plus and minus spherical lenses, group D plus cylinders and group E an axis indicator, a blinder or opaque lens, a cylinder for muscle testing and a rotary prism.

The main pivot shaft 65 is shown in detail in Figure 13 of the drawings and is of sectional formation, the section 66 providing a pivot for the testing elements in group B, the section 67 for group C, the section 68 for group D and the section 69 for group E. The shaft sections are of arcuate formation, so that the combined elements as shown in Figure 7 of the drawings will be arranged in the form of an arc.

The mounting of all of the testing elements is similar and consists (see Figures 18 to 21), of an arm 69ª whose inner end is slitted as at 70 and sprung over its particular section of the shaft 65. The inner end of the arm 69ª has pivotally secured thereto a link 71, while pivotally secured to this link is a lever 72 which is also slitted after the manner of the arm 69ª so as to receive a pivot shaft 73, over which the lever 72 is sprung. The lever 72 has also pivotally connected thereto a link 74 and this last mentioned link is in turn pivotally connected to an arm 75 which has one end slitted and sprung over a shaft 76. Also pivotally secured to the arm 75 is one end of a rod 77, whose opposite end is connected to an arm 78 which is mounted upon a shaft 79 having bearings in the cabinet. The shaft 73 is, like the shaft 65 of sectional formation, there being a separate section for each group B, C, D and E of the testing elements, while spacing elements 80 are provided for separating the levers 72 and holding them in proper spaced relation. Each of the arms 75 carry a roller 81 which is adapted to engage a horizontally curved yoke 82 which is supported by hanger arms 83, pivotally mounted as at 84. The shaft 73 is mounted in bearing standards 85 which rise from the bottom of the cabinet and the shaft 76 upon which the arms 75 are mounted is supported in bearings 86. This last mentioned shaft is also of sectional formation, each section being of an arc to accommodate its particular group. The arms 75 are separated by spacing elements 87.

Pivotally mounted in bearing brackets 88 secured to the bottom of the cabinet are arms 89, one set of which are connected by a bar 90, while another set of arms 89 are connected by a bar 91, as shown in Figure 8 of the drawings. The bar 90 has extending therefrom an arm 92, while a similar arm extends from the bar 91. Each of the arms 92, (see Fig. 19,) carry a roller 93 and the latter is adapted to engage the notched end 94 of a vertically disposed arm 95. This arm as shown in Figures 16 and 17 of the drawings is pivotally mounted as at 96 in the upper end of a bearing bracket 97 which rises from the bottom of the cabinet. The arm 95 is yieldingly forced in a direction to engage the roller 93 by means of a flat spring 98 which is mounted upon the bracket 97 as shown at 99. The arm 95 is offset at one edge so as to engage the yoke 82, as plainly shown in Figures 17, 18 and 19 of the drawings.

The construction just described is applicable to groups C and D of the testing elements, the elements of group C being in the form of plus and minus lenses 100 and 101 as shown in section in Figures 29 and 30 respectively and in elevation in Figure 26. This last mentioned figure may also represent the blinder or opaque lens, a section of which is shown in detail in Figure 31. These lenses are mounted in frames 102 which are split as indicated at 103, a suitable fastening device such as a screw serving to close the frames so as to hold the lenses in position. Each frame has extending therefrom a relatively flat, cross sectionally rectangular sleeve 104 which is adapted to receive the outer end of one of the arms 69ª. These arms 69ª are provided with longitudinally extending strengthening beads as shown in Figure 28 of the drawings and their outer ends are slitted as at 105 to provide resilient fingers which may be compressed and forced into the sleeves 104 and held therein by frictional engagement. The lenses may thus be conveniently removed and others substituted as desired.

The various testing elements are adapted to be positioned within the sight openings 44 and for this purpose there is provided seats 106, 107, 108 and 109 which are adapted to respectively receive the testing elements of groups B, C, D and E, each seat being disposed concentrically with respect to its particular group.

The testing elements of groups B and E are adapted to be moved manually into and out of position within the sight openings and co-operate with the testing elements of groups C and D as will be hereinafter explained. Groups C and D have their testing elements manually moved into active position within the sight openings and automatically returned so that only a single lens of either of these groups may be accurately positioned. The operation of the testing elements of groups C and D is effected through the mechanism previously described and is as follows:

Assuming that all of the elements of groups C and D are arranged substantially vertical or slightly to one side of the vertical center and engaging a stop 110 (see Figures 17 and 22,). Rotation of one of the shafts 79 will cause the arm 78 to move downward and will carry with it its particular arm 75 from the upper position shown in Figure 17 to the lower position of said figure. This movement will, through the link 74, rock the lever 72 and move the arm 69$^a$ with its testing element downward into its particular seat. If it is desired to substitute another testing element for the one just seated, another shaft 79 is rocked. The particular arm 75 of the shaft just rocked will move from the position $a$ shown in Figure 18 to the position $b$ of said figure, while no movement will be imparted to the particular arm 69$^a$ which is connected to the arm 75 just moved, due to the fact that the links 71 are provided with elongated slots 111 which receive the pivots connecting them to the levers 72. A lost motion is thus provided between the links 71 and levers 72 which is indicated at $c$ and $d$ in Figure 18 and shown by the dotted lines $e$ and $f$ in Figure 20. This movement is sufficient to cause the roller 81 to engage the curved yoke 82 and the latter will be swung outward against the action of a spring 112 and will carry with it the arm 95 to release the roller 93. The free end of the arm 92 has connected thereto a coiled spring 113 which, when the roller 93 is released, will pull the arm 92 upward and carry with it the bar 90 and the latter will engage the depressed arm 75 and cause the same to actuate the lower arm 69$^a$ to carry upward its particular testing element. This will occur during the lost motion between the link 71 and the lever 72, after which the testing element now selected will move into the seat just vacated. The arm 75 of the testing element just raised will move to its elevated position as shown in Figure 19 of the drawings with the center of its roller 81 above the curved yoke 82, the latter being forced over to engage the roller by means of the spring 112 which bears against the arm 83, movement of the said arm in this direction being limited by a stop 114, shown in Figures 15 and 19 of the drawings.

The group B of the testing elements is formed of high power or master lenses both plus and minus, while group E is formed of an axis indicator, a blinder or opaque lens, a cylinder for muscle testing, the latter taking the place of a Maddox rod, and a rotary prism. All of these testing elements are manually moved into and out of position by means of the mechanism illustrated in Figure 21. This mechanism is somewhat similar to the operating mechanisms for testing elements of groups C and D and includes a link 71$^a$, which has one end pivotally secured to the arm 69 of a testing element and its opposite end pivotally secured to a lever 72$^a$ which is pivotally mounted upon the shaft 73 and which is connected by means of a link 74$^a$ with an arm 75$^a$. This arm is pivotally mounted upon the shaft 76, but is shorter than the arms 75 previously described and is connected by means of a curved rod 77$^a$ with one of the arms 78 mounted upon one of the shafts 79 previously mentioned. This mechanism is duplicated for each of the elements of the groups B and E.

All of the arms 69$^a$ operate in an arcuate guide 115 which is shown in plan in Figure 8 of the drawings and in section in Figures 9, 10 and 11. This guide consists of a horizontally disposed base which provides a rest for the arms 69$^a$ when the latter are in lowered or active position, while rising from this base are spaced fins 116 between which the said arms 69$^a$ are guided in their pivotal movements. Each group of testing elements is separated, one group from the other, by a relatively thick fin 117 which may be undercut as shown in Figure 9 of the drawings so as to provide space for bearings 118 for the pivot shaft 65.

One of the rotary cylinders is illustrated in elevation in Figure 32 and in section in Figures 36 and 37 and is mounted within a frame 119 whose periphery is provided with teeth 120. This frame 119 is rotatable within a channel-shaped guide frame 121 which is carried at the outer end of one of the arms 69$^a$ and is formed after the manner of the frames of the plus and minus lenses previously described, so that the cylinders may be conveniently placed therein or removed therefrom. The guide frames 121 of the cylinders are each provided with a cut-away portion 122 to expose a section of the teeth 120.

The rotary prism is shown in elevation in Figure 33 and in section in Figure 38 and comprises a pair of prisms 123 which are relatively rotatable about a common axis in order to change the prism power. Each prism 123 has secured thereto a frame 124 which is provided with beveled gear teeth 125 and these teeth are engaged by a beveled pinion 126, which, when rotated will rotate the prisms 123 in opposite directions. The pinion 126 is mounted upon a shaft which has a bearing in a ring or annulus 127 which is carried at the outer end of one of the arms 69 and which has threadedly secured over one edge a cap 128 and over the other edge a cap 129. These caps are provided with annular grooves which receive annular ribs 130 so as to provide guides for the prisms and hold them in proper relative position. The frame of one of the prisms in addition to being provided with beveled gear teeth 125, is also provided with spur gear teeth 131, a portion of which is visible through a slot 132 provided in the cap 129.

The rotary cylinders as shown in Figure 32 are provided with graduations and with inner and outer circularly arranged numbers indicative of the strength of the cylinders in certain position, these numbers cooperating with a pointer or indicator 133 at the top of the guide frame 121. The outer circular arrangement of numbers indicate plus correction while the inner circular arrangement of numbers indicate minus correction according to the degree of rotation of the cylinders. Similar indicia is provided for the rotary prism as shown in Figure 33, that is, this prism is provided with graduations and numbers which are adapted to be positioned opposite a pointer or indicator 134. In addition, the prism is provided with oppositely located lines 135 having upon opposite sides the words "in" and "out." The axis indicator which is shown in elevation in Figure 35 and in section in Figure 40 is rotatable within a guide frame 136 which is carried at the outer end of one of the arms 69ª and which is provided with an indicator or pointer 137. Indicia 138 is provided upon the axis indicator, the said indicator being in the form of an annulus or ring within which extends fingers 139. These fingers are connected by a hair 140 whose angular position may be changed by rotating the axis indicator. The indicator is provided around its periphery with teeth 141 which are visible through a slot 142 provided in the frame 136.

In Figures 34 and 39 there is illustrated a cylinder which is designed to take the place of the usual Maddox rod for muscle testing and as shown comprises a guide frame 143 which is carried at the outer end of one of the arms 69ª and within which is rotated the cylinder indicated at 144. This cylinder is surrounded by a frame whose periphery is provided with spur teeth 145 which are visible through a slot or opening 146 provided in the frame 143. The cylinder is fluted or corrugated on one face, the purpose of which is well understood by those versed in the art. The frame 143 carries a pointer or indicator 147 which co-operates with graduations or indicia upon one face of the cylinder.

When the elements illustrated in Figures 32 to 34 inclusive are in lowered position, their respective pointers or indicators will be at the top and these pointers or indicators together with the indicated indicia will be visible through a notch 148 provided at the top of the sight openings 44.

The axis indicator is located within group D of the testing elements and as stated, each of the elements of this group is adapted to be positioned within the seat 108. When in this position, their spur teeth will be engaged by a worm gear 149 which is mounted upon a shaft 150 extending transversely beneath the seat. The gear 149 is engaged by a worm 151 which is mounted on one end of a shaft 152, the opposite end of this shaft having secured thereon a beveled pinion 153 which is engaged by a beveled gear 154. This gear is mounted upon one end of a shaft 155 which extends through the casing and is provided with a knurled operating knob 156. By rotating this knob the particular element occupying the seat 108 may be adjusted to obtain the desired strength.

The elements illustrated in Figures 32, 33 and 34 occupy the seat 109 when they are in position before the sight openings and their gear teeth are adapted to be engaged by a worm gear 157 which is also mounted upon the shaft 150. This gear is engaged by a worm 158 which is secured upon the outer end of a shaft 159, this last mentioned shaft extending through the cabinet and being provided with a knurled operating knob 160. Means for adjusting these elements is thus provided.

The shafts 79 extend through the cabinet and are provided with an operating handle or finger 161, one of which is provided for each element. These shafts also extend through an index plate or value chart 162 which is secured to the cabinet and which is provided with indicia indicating the value of the testing elements. As shown in Figure 25 of the drawings there is illustrated five rows of shafts 161 with eleven shafts in each row, although this number may be varied if desired. The innermost row is preferably divided into an upper and lower section, there being five shafts in the upper section and six in the lower section. The first three shafts of the second and third rows are connected to the high power or master lenses whose value is indicated as plus 6.50, plus 13.00, plus 20.00, plus 1.50, minus 6.50, minus 13.00. The remaining shafts in these two rows and the first row are connected to the minus lenses and arranged in value from 0.12 to 6.37. The first shaft of the fourth row is connected to the axis indicator, while the first shaft of the second row is connected to the opaque disk or blinder. The shaft immediately below is connected to the muscle testing cylinder shown in Figure 34, while the next shaft below is connected to the rotary prism. The remaining shafts are connected to the rotary cylinders which are all plus cylinders.

In reading an index plate or value chart, assuming that a master lens is positioned before the sight opening and a spherical lens used to reduce its power, the value of the spherical lens will be deducted from the value of the master lens. As an example, if lens plus 6.50 is used and is found to be of too great a strength and its power is reduced by the use of minus lens 0.25, the resultant value will be read at the top of the square or block which includes the marking of lens minus 0.25 and will be found to be plus 6.25. Should master lens plus 13.00 be used and the same minus spherical lens used in connection therewith, the result will be read at the bottom of the said square and will be plus 12.75. The master lenses just mentioned are the ones most commonly used, so that the result of the association of the minus lenses therewith, is for convenience figured out, while the result of the use of the remaining lenses may be figured in the usual manner.

In testing the eyes in a case of plain hyperopia, the plus 6.50 master lens may be positioned before the eye and if the error of refraction is below 6.50, the plus quantity before the eye serves as a well known fogging quantity and acts to hold the accommodation of the eye in subjection and to prevent "spasms" that the successful practitioner must control. Then the minus spheres are interposed until the shadow is neutralized in the retinoscope. Working at the usual distance with the patient fixing his sight on an object twenty feet away, neutrality of the shadow will result when the total lens strength equaling the error of refraction has been left before the eye, plus a plus quantity equal 1.50, this quantity making up for the difference of the distance of the operator and the distance of the patient from the object. It will be seen that by interposing the minus spheres in opposition to the master plus lenses, the plus lens used is reduced in dioptric strength in the same amount as the index power of the particular minus lens used. If the error of refraction is above 6.50, then it will be necessary to use the plus 13.00 master lens and proceed as before explained. When the plus 6.50 master lens is used, the upper numerals of the respective index numbers express the resultant plus power before the eye, while if the plus 13.00 master lens is used then the lower line of numerals express the resultant plus quantity, so that the operator in the use of these two master lenses does not at any time have to deduct or add in arriving at the quantity before the eye of the patient. Due to the rapidity with which the lenses may be changed before the eye, spasms of the accommodation are avoided and the test conducted in a most rapid manner.

In a case of myopia, the plus 1.50 master lens in group 2 is interposed and the test proceeded with by interposing the lenses as they come in the first group until the shadow is neutralized, then the center number expresses the error of refraction, no attention being paid to the master lens. If it is seen that the error amounts to more than minus 6.37, then the master lens minus 6.50 is interposed and the test proceeded with. When neutrality is reached the master lens added to the center figure of the auxiliary lens used therewith, will express the total error.

In a case of astigmatism, the shadow is neutralized in one meridian and the case reduced to simple astigmatism. The axis indicator is then interposed in the line of vision and rotated until the hair line is in a line directly parallel with the astigmatic band seen in the retinoscope, the exact axis being read at the top of the indicator in the usual position. After the axis is known, it is a simple matter to interpose quickly and rapidly the lenses that will neutralize the astigmatism, the cylinder being easily and quickly positioned by the means already described with the axis always indicated at the top and in the regular position.

In a case of heterotropia or heterophoria, the cylinder shown in 34 is interposed before the left eye and the vision is directed to a spotlight 20 feet away. If there is muscular unbalance the streak produced by the lens mentioned will appear either to the right or to the left of the light that is seen by the right eye. In either case the rotary prism is interposed in front of the right eye and set at neutral and is then rotated to bring its base over the weak muscle until the streak is directly over the spotlight. The resultant prism strength is the measure of the abnormality of the lateral muscles. To measure the abnormality of the vertical muscles, the cylinder just mentioned is placed over the right eye and the streak caused to appear horizontally and if the said streak appears above or below the light seen by the left eye, the eight degree prism is brought before the left eye and positioned at neutral. It is then rotated to bring the bases of the prisms together to produce prism power in the proper direction to bring the streak directly over the light, whereupon the indicia will indicate the measure of abnormality.

It is preferred that all minus markings on the index plate be of a distinguishing color, for example, red, and that all minus markings on the cylinder lenses within the cabinet be also red, so that throughout the entire operation of the instrument in all cases where minus lens quantity is involved, they will be indicated in red. All plus markings may be indicated in white.

It will be apparent that in testing or making an examination for refractive errors with the above described instrument, the entire examination can be made much quicker than with the instrument now in use and may be done with a considerable less number of movements of the operator or interpositions of lenses before the eyes of the patient. This is due to the fact that the operator's first movement is direct to the required lens and with three movements of the hand, he may interpose three different lenses before the eye at three distinctly different times, so that considerable time is saved for the operator and the patient is not subjected to an unduly long and tiresome examination.

For the purpose of preventing movement of the testing elements in groups C and D into position between the sight openings 44 before the return of the previously position element, movement of one of these elements to an active position, that is, to a position within the sight openings, will automatically lock the remaining elements of either of these groups. This is accomplished by the provision of spaced horizontally movable stops 163 carried by a bar 164, as illustrated in Figures 41 to 48 of the drawings. This bar is supported at each end upon a roller 165 which operates through a slot in each end of the bar, the roller being mounted in a bracket 166. The stops 163 and the bar 164 provide a comb-like structure with the outer ends of the teeth offset as at 167, so that the said stops are comparatively wide. These stops are normally positioned as shown in Figure 44 of the drawings, so that the arms 75 are located immediately above the space between the stops, whereby they will be permitted to descend when one of the operating arms 161 is operated in the manner previously described. The arm 75 will descend until it is in contact or in close relation to the bar 164 and will occupy a position between the stops, as shown in Figure 42 of the drawings. The bar 90 will thus be depressed from the position shown in Figure 43 to the position shown in Figure 41 and will carry with it a cam arm 168. This arm is provided with a cam slot 169 within which is positioned a roller 170 and due to the shape of the slot 169, downward movement of the bar 90 will cause the stop bar with its stops 163 to move laterally from the position shown in Figure 44 to the position shown in Figure 42, so that the said stops will be positioned immediately below the arm 75 and limit their downward movement. The distance of downward movement of the arms 75 is now only equal to the degree of lost motion between the link 71 and the lever 72, so that should the operator attempt to move another of the testing elements only this lost motion will occur. A release however of the depressed arm 75 is effected as soon as the arm 95 is moved to release the roller 93 and permit the bar 90 to move upward under the influence of the spring 113 previously described. As is apparent, when the roller is released, the bar 90 will move upward and will carry with it the cam arm 168 so that the stop bar will be moved to its original position and the stops again located as in Figure 44. This movement of the stop bar 164 is effected before the depressed arm 75 reaches the offset portion 167 of the stop.

The bar 164 is slotted as at 171 to permit of downward movement of the arm 92, the width of this slot being sufficient to permit the stop bar and stops to move laterally.

The invention is susceptible of various changes in its form, proportions and minor details of construction and the right is herein reserved to make such changes as properly fall within the scope of the appended claims.

Having described the invention what is claimed is:—

1. In an optometer, a pair of spaced cabinets, each cabinet having a sight opening therein, a plurality of lenses movable therein, means whereby said lenses may be selectively positioned within the sight opening, a stationary guide, a hanger rod secured to the guide for supporting the latter, slidable arms extending oppositely from the ends of the guide and connected to the cabinets for supporting the latter and means whereby the arms may be simultaneously moved in opposite directions to change the distance between the interpupilary centers of the lenses.

2. In an optometer, a series of pivotally mounted laterally swinging testing elements arranged transversely of the axis of their pivots and means whereby said elements may be moved from an inactive to an active position.

3. In an optometer, a series of pivotally mounted laterally movable testing elements, means whereby said elements may be moved from an inactive to an active position and means whereby movement of an element to an active position will cause a prior actively positioned element to be returned to an inactive position.

4. In an optometer, a series of pivotally mounted laterally movable testing elements arranged substantially parallel and in arcuate formation and means whereby said elements may be selectively moved from an inactive position to an active position substantially concentric with their arc.

5. In an optometer, a cabinet having a sight opening therein, a series of movable testing elements within the cabinet, means whereby said elements may be moved into and out of position within the sight opening, a value chart located upon the outside of the cabinet and representing the values of the testing elements within and an operating member for each testing element, said member being located upon the outside of the cabinet adjacent the represented value of its particular testing element.

6. In an optometer, a cabinet having a sight opening therein, a series of movable testing elements within the cabinet, means whereby said elements may be moved into and out of position within the sight opening, a value chart located upon the outside of the cabinet and representing the values of the testing elements within, an operating member for each testing element, said member being located upon the outside of the cabinet adjacent the represented value of its particular testing element and means also included in the chart for indicating the combined power of a plurality of testing elements.

7. In an optometer, a cabinet having a sight opening therein, a series of movable testing elements within the cabinet, means whereby said elements may be moved into and out of position within the sight opening, a value chart located upon the outside of the cabinet and representing the values of the testing elements within, an operating member for each testing element, said member being located upon the outside of the cabinet adjacent the represented value of its particular testing element and means also included in the chart for indicating the combined power, plus and minus, of a plurality of testing elements.

8. In an optometer, a series of testing elements mounted for swinging movement, means whereby said elements may be moved from an inactive to an active position and means whereby, when one of the testing elements is in active position, movement of another element will effect the return of the first moved element to an inactive position.

9. In an optometer, a series of testing elements, means whereby said elements may be moved from an inactive to an active position and means whereby, when one of the testing elements is in active position, movement of another element will effect the return of the first moved element to an inactive position prior to the operation of the second moved element.

10. In an optometer, a series of testing elements, means whereby said elements may be moved from an inactive to an active position and means whereby, when one of the testing elements is in active position, movement of another element will effect the return of the first moved element to an inactive position and means for causing a tarry in the operation of the latter, whereby the retaining element will reach an inactive position prior to the movement of the second element.

11. In an optometer, a series of movable testing elements, means whereby said elements may be moved from an inactive into an active position, means for supporting the elements in the last named position and means carried by the support and detachably engaging the elements, whereby the latter may be adjustably rotated, indicia carried by the testing elements and means positioned at the top of said elements when the latter are in active position, whereby their adjusted positions will be indicated.

12. In an optometer, a plurality of testing elements divided into separate groups and means whereby one or more of said elements may be moved from an inactive position to an active position and means included in the moving means of certain groups, whereby an active testing element must be returned to inactive position prior to the movement of an inactive testing element.

13. In an optometer, a plurality of pivotally mounted arms, testing elements carried thereby, means whereby the arms may be operated to selectively move any of the testing elements from an inactive to an active position, means engageable with the arm operating means to hold the elements in active position, means for automatically returning the elements to an inactive position when the holding means is released and means whereby operation of the arm operating means will release the holding means prior to the movement of another of the testing elements.

14. In an optometer, a series of normally inactive testing elements, means whereby said elements may be moved to an active position, means whereby the inactive elements will be locked against movement when one of said elements is in an active position and means operable upon the return of the last mentioned element to an inactive position to release all of said elements.

15. In an optometer, a series of normally inactive testing elements, means whereby said elements may be moved to an active position, means operable upon movement of one of the elements to an active position whereby the remaining elements will be held inactive, said means including spaced horizontally movable stops, means whereby said stops will hold the elements inactive, means for releasing the actively positioned element and means operable upon the initial movement of the actively positioned element to operate the stops and release all of the actively positioned elements.

16. In an optometer, a series of pivotally mounted testing elements arranged one behind the other in substantially arcuate formation and means whereby said elements may be selectively moved substantially concentric with their arc from an inactive position to an active position.

17. In an optometer, a pair of spaced cabinets, each cabinet having a sight opening therein, a plurality of lenses contained within the cabinets and capable of being positioned within the sight openings, means including a horizontally disposed guide for adjustably connecting the cabinets to regulate the distance between the interpupilary centers of the lenses, an arch-shaped member secured to the guide and extending over the sight openings, a hanger rod secured to the arch-shaped member and a brow piece adjustably secured to the hanger rod.

18. In an optometer, a pair of spaced cabinets, each cabinet having a sight opening therein, a plurality of lenses contained within the cabinets and capable of being positioned within the sight openings, means including a horizontally disposed guide for adjustably connecting the cabinets to regulate the distance between the interpupilary centers of the lenses, an arch-shaped member secured to the guide and extending over the sight openings, a hanger rod secured to the arch-shaped member, an arm adjustably secured to the hanger rod and a card holder adjustable upon said arm.

19. In an optometer, a pair of spaced cabinets, each cabinet having a sight opening therein, a plurality of lenses contained within the cabinets and capable of being positioned within the sight openings, means including a horizontally disposed guide for adjustably connecting the cabinets to regulate the distance between the interpupilary centers of the lenses, an arch-shaped member secured to the guide and extending over the sight openings, a hanger rod secured to the arch-shaped member, an arm adjustably secured to the hanger rod and a card holder adjustable upon said arm and means included in the car holder to permit of vertical adjustment of a card and to yieldingly hold said card in adjusted position.

In testimony whereof I affix my signature.

WALTER R. WILSON.